(12) United States Patent
Zhang et al.

(10) Patent No.: US 9,857,624 B2
(45) Date of Patent: Jan. 2, 2018

(54) LIQUID CRYSTAL DISPLAY PANEL AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Long Zhang, Xiamen (CN); Ting Zhou, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 207 days.

(21) Appl. No.: 14/985,271

(22) Filed: Dec. 30, 2015

(65) Prior Publication Data

US 2016/0238884 A1 Aug. 18, 2016

(30) Foreign Application Priority Data

Feb. 13, 2015 (CN) .......................... 2015 1 0078157

(51) Int. Cl.
*G02F 1/1335* (2006.01)
*G02F 1/1337* (2006.01)

(52) U.S. Cl.
CPC .. *G02F 1/133528* (2013.01); *G02F 1/133514* (2013.01); *G02F 1/133516* (2013.01); *G02F 1/133753* (2013.01); *G02F 2001/133538* (2013.01); *G02F 2001/133757* (2013.01)

(58) Field of Classification Search
CPC ... G02F 2001/133531; G02F 1/133753; G02F 1/133757; G02F 1/133533
See application file for complete search history.

(56) References Cited

U.S. PATENT DOCUMENTS 8,866,997 B2 * 10/2014 Pau .................. C09K 19/38
349/127
2006/0023143 A1 * 2/2006 Lee .................. G02B 27/26
349/102

* cited by examiner

*Primary Examiner* — Phu Vu
(74) *Attorney, Agent, or Firm* — Anova Law Group, PLLC (57) ABSTRACT

The present disclosure provides a liquid crystal display panel. The liquid crystal display panel includes an upper substrate configured with a color filter having a plurality of first color barriers, second color barriers, and third color barriers, a lower substrate configured with a thin film transistor array facing toward the upper substrate, a liquid crystal layer sandwiched between the upper substrate and the lower substrate, an upper polarizer disposed on the upper substrate having a second absorption axis, a lower polarizer disposed on the lower substrate having a first absorption axis that is orthogonal to the second absorption axis, and a regionalized polarizer having a plurality of first polarizing units, second polarizing units, and third polarizing units with polarization directions forming a first angle, a second angle, and a third angle with the polarization direction of the upper polarizer respectively.

18 Claims, 8 Drawing Sheets

LIQUID CRYSTAL DISPLAY PANEL AND FABRICATION METHOD THEREOF

CROSS-REFERENCES TO RELATED APPLICATIONS

This application claims the priority of Chinese Patent Application No. CN201510078157.0, filed on Feb. 13, 2015, the entire contents of which are incorporated herein by reference.

FIELD OF THE DISCLOSURE

The present disclosure generally relates to the field of display technologies and, more particularly, relates to a liquid crystal display panel and a fabrication method thereof.

BACKGROUND

Among various flat panel display devices, thin film transistor liquid crystal displays (TFT-LCD) dominate the mainstream flat penal display market due to their compact size, low power consumption, relatively low manufacturing cost, and zero radiation. A liquid crystal display device mainly includes a liquid crystal display panel and a back light module. The back light module is the light source that provides the light to illuminate the liquid crystal display panel. The light emitted out of the liquid crystal display panel is modulated by the liquid crystal display panel to display images.

Figure 1:
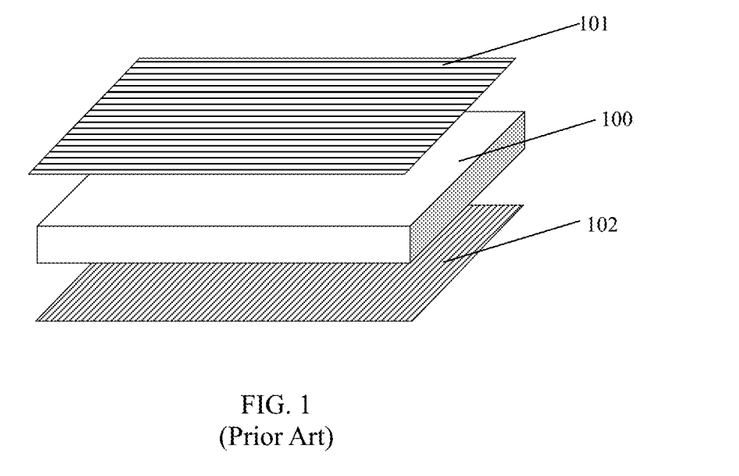
FIG. 1 illustrates a schematic view of a liquid crystal display panel.

FIG. 1 illustrates a schematic view of a liquid crystal display panel. Referring to FIG. 1, a liquid crystal display panel includes a liquid crystal cell 100 and two polarizers 101 and 102 attached to the upper and lower sides of the liquid crystal cell 100. The liquid crystal cell 100 includes a color filter. The light emitted from the back light module passes through the color filter and is mixed together to display various colors. Ideally, the displayed colors reproduce the natural colors as much as possible. Alternatively, the displayed colors are adjusted to approximate the desired colors to satisfy user's requirements and to adapt to the specific application environment of the liquid crystal display panel.

Figure 2:
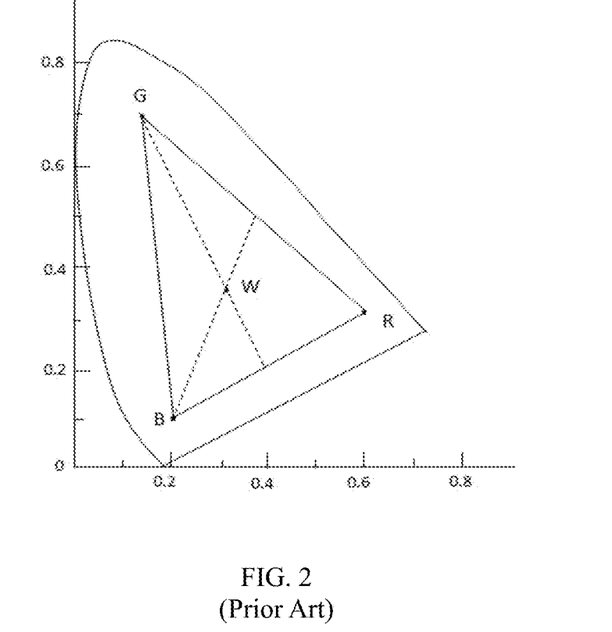
FIG. 2 illustrates a schematic view of a CIE-xy chromaticity diagram.

The white point adjustment is among most important aspects of color adjustment. FIG. 2 illustrates a schematic view of a CIE-xy chromaticity diagram. Referring to FIG. 2, the diagram represents a given color in chromaticity hue and saturation position in the color base coordinate system. Specifically, the XYZ display system has the tristimulus values X, Y, and Z represented in the chromaticity coordinates as the horizontal axis $x=X\div(X+Y+Z)$ and the vertical axis $y=Y\div(X+Y+Z)$. All the colors that can be seen by human eyes are shown in the diagram as the inner portion of the horseshoe shape formed by the closed curve C. The R, G, and B points in the diagram represent the three primary colors, red, green, and blue respectively in a certain color display system. All the colors on the sides of the triangle RGB or inside the triangle RGB may be represented in a proper mixture of the three primary colors. In addition, the white color with the maximum brightness is represented at the point W where all three primary colors reach the maximum brightness. The white color W point is in the vicinity of the triangle RGB centroid.

When designing a color display system, an optimized and requirement satisfying white color point is obtained by adjusting the maximum brightness of the R, G, and B points. In the current technologies, the thicknesses of the red color barriers, green color barriers, and blue color barriers in the color filter are adjusted to optimize the white color point. For example, increasing the thickness of the green color barriers may decrease the light-transmittance of the green color barriers and thereby reduce the maximum brightness of the green light.

However, the method of matching the white color point by adjusting the thicknesses of the color barriers may have certain limitations. For example, after the thicknesses of the color barriers are determined, the brightness of the color barriers cannot be changed. When the color display system has additional special requirement for the white color point, further adjustment of the thicknesses of the color barriers to optimize the white color point may cause substantial differences in the thicknesses of the color barriers and thereby may affect the display effect.

Another drawback of the color barrier thickness adjustment method is that each white color point designed for a certain specification requires a matching color filter with fixed thicknesses of the color barriers. As a result, liquid crystal display panels with different product specifications may need different color filters. The inability of sharing a common color filter across different liquid crystal display panel products may increase the production cost.

The disclosed liquid crystal display panel and fabrication method are directed to solve one or more problems in the art.

BRIEF SUMMARY OF THE DISCLOSURE

Directed to solve one or more problems set forth above and other problems in the art, the present disclosure provides a liquid crystal display panel and a fabrication method to improve image viewing experience.

One aspect of the present disclosure includes a liquid crystal display panel. The liquid crystal display panel includes an upper substrate configured with a color filter having a plurality of first color barriers, second color barriers, and third color barriers, a lower substrate configured with a thin film transistor array facing toward the upper substrate, a liquid crystal layer sandwiched between the upper substrate and the lower substrate, an upper polarizer disposed on the upper substrate having a second absorption axis, a lower polarizer disposed on the lower substrate having a first absorption axis that is orthogonal to the second absorption axis, and a regionalized polarizer having a plurality of first polarizing units, second polarizing units, and third polarizing units with polarization directions forming a first angle, a second angle, and a third angle with the polarization direction of the upper polarizer respectively.

Another aspect of the present disclosure provides a method of fabricating the liquid crystal display panel. The fabrication method includes forming an upper substrate with a color filter having a plurality of first color barriers, second color barriers, and third color barriers; and forming a lower substrate with a thin film transistor array facing toward the upper substrate; forming an upper polarizer on the upper substrate having a second absorption axis. The fabrication method also includes forming a lower polarizer on the lower substrate having a first absorption axis that is orthogonal to the second absorption axis; and forming a regionalized polarizer between the upper polarizer and the lower polarizer on the upper substrate or the lower substrate. The regionalized polarizer has a plurality of first polarizing units, second polarizing units, and third polarizing units with polarization directions forming a first angle, a second angle, and a third angle with the polarization direction of the upper polarizer, respectively. Further, the fabrication method includes dropping liquid crystals on the upper substrate or the lower substrate, and bonding the upper substrate and the lower substrate together to form the liquid crystal display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 3:
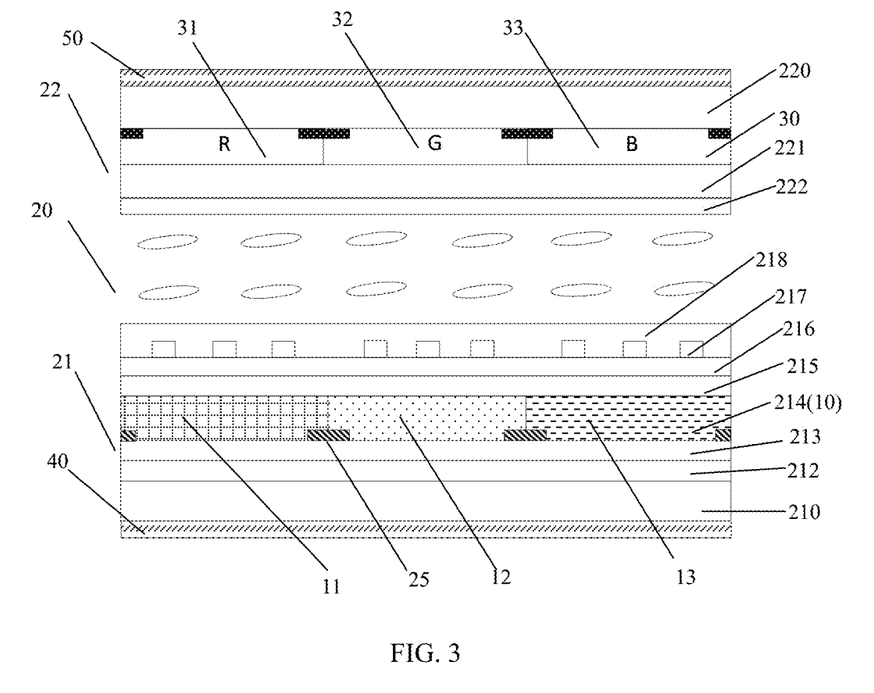
FIG. 3 illustrates a schematic view of an exemplary liquid crystal display panel according to the disclosed embodiments.

FIG. 3 illustrates a schematic view of an exemplary liquid crystal display panel according to the present disclosure. Referring to FIG. 3, the liquid crystal display panel may include a lower polarizer 40, a lower substrate 21, an upper substrate 22, an upper polarizer 50, and a liquid crystal layer 20 sandwiched between the lower substrate 21 and the upper substrate 22. Other components may also be included.

In one embodiment, the lower substrate 21 may be configured with an actively driven thin film transistor array to form an array substrate. The lower polarizer 40 may be attached to the side of the lower substrate 21 opposite to the thin film transistor array side and facing away from the liquid crystal layer 20. The upper substrate 22 may be configured with a color filter 30 for displaying colors to form a color film substrate. The upper polarizer 50 may be attached to the side of the upper substrate 22 opposite to the color filter side and facing away from the liquid crystal layer 20.

Specifically, the lower substrate 21 may include a transparent base substrate 210. The transparent base substrate 210 may be sequentially configured with an active layer (not shown), a gate insulating layer 212, and a first insulating layer 213. Data lines 25 may be formed on the first insulating layer 213. A lower planarization layer 214 may be formed on the data lines 25 and the first insulating layer 213. The lower planarization layer 214 may also provide a polarizing function. That is, a regionalized polarizer 10 may be formed coplanar with the lower planarization layer 214.

A plurality of first electrodes 215 and second electrodes 217 may be formed on the planarization layer 214. The first electrodes 215 and the second electrodes 217 may be separated and insulated by a second insulating layer 216. The second insulating layer 216 may be formed on the first electrodes 215 and the lower planarization layer 214. A lower alignment layer 218 may be formed on the second electrodes 217 and the second insulating layer 216. The lower alignment layer 218 may contact the liquid crystal layer 20. The lower alignment layer 218 may be configured to provide an initial alignment direction to the liquid crystal molecules on the side of liquid crystal layer 20 facing toward the lower substrate 21.

The lower planarization layer 214 may be made mainly of a mixture of acrylic resin, naphthoquinone diazide ester, 1,4-dioxane, coupling agent, diethylene glycol ethyl methyl ether, and propylene glycol methyl ether acetate, etc. The fluidity of the mixture may be desirable for filling and smoothing the gaps and steps caused by the thickness differences when the data lines 25 and the gate insulating layer 212, etc. are formed. Thus, the lower planarization layer 214 may have a flat top surface. When the first electrodes 215 are formed on the lower planarization layer 214, the first electrodes 215 may also have flat top surfaces. Subsequently, a uniform distance between the first electrodes 215 and the second electrodes 217 may be obtained to increase the distribution uniformity of the electric field between the first electrodes 215 and the second electrodes 217.

At the same time, the lower planarization layer 214 may be used to reduce the coupling capacitances between the first electrodes 215 and metal lines such as the data lines 25 to improve the display effect of the liquid crystal display panel. Further, the lower planarization layer 214 may be made of an organic film forming material doped with a dichroic organic dye. When the organic film coating process is completed, a regionalized polarizer 10 with a plurality of regions with different polarization directions may be formed through an optical alignment process.

In one embodiment, the first electrodes 215 may be common electrodes, and the second electrodes 217 may be pixel electrodes. The first electrodes 215 and the second electrodes 217 may be used to provide the liquid crystal display panel with a horizontal electric field parallel to the surface of the lower substrate 21 to drive the liquid crystal molecules in the liquid crystal layer 20 to rotate to alter the polarization direction of the incidental light passing through the liquid crystal layer 20.

The upper substrate 22 may include a transparent base substrate 220. A color filter 30, an upper planarization layer 221, and an upper alignment layer 222 may be formed sequentially on the transparent base substrate 220. The upper alignment layer 222 may contact the liquid crystal layer 20 to provide an initial alignment direction to the liquid crystal molecules on the side of the liquid crystal layer 20 facing toward the upper substrate 22. The upper alignment layer 222 may have a rubbing direction parallel with the rubbing direction of the lower alignment layer 218. The color filter 30 may include a plurality of color barriers, corresponding to a plurality of sub-pixel units enclosed by metal lines such as gate lines 25 on the lower substrate 21.

In one embodiment, the color filter 30 may include a plurality of first color barriers 31, second color barriers 32, and third color barriers 33 for displaying various colors. The first color barriers 31, the second color barriers 32, and the third color barriers 33 may be arranged alternately and repeatedly in rows on the color filter 30. Color barriers displaying a same color may be arranged in columns on the color filter 30. For example, first color barriers 31 may be arranged in one column, and second color barriers 32 may be arranged in adjacent column.

Figure 4:
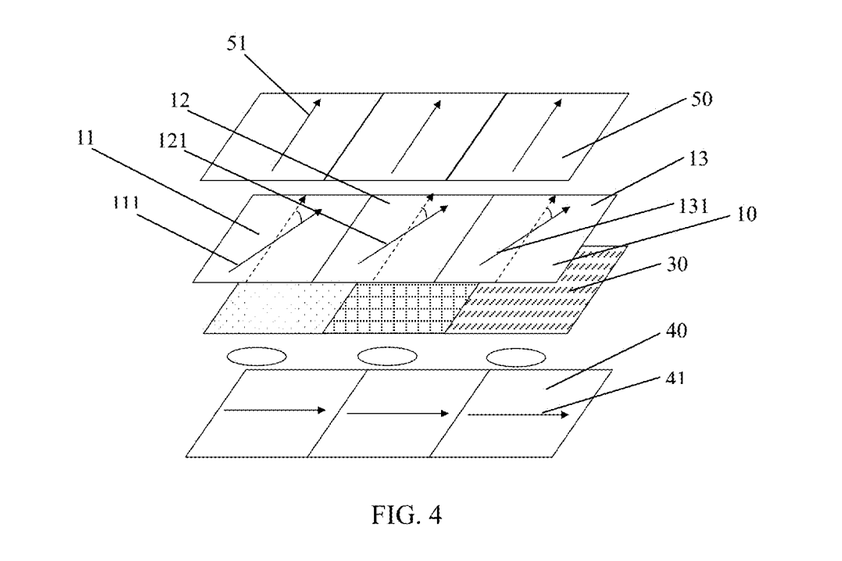
FIG. 4 illustrates a schematic view of an exemplary regionalized polarizer according to the disclosed embodiments.
Figure 5:
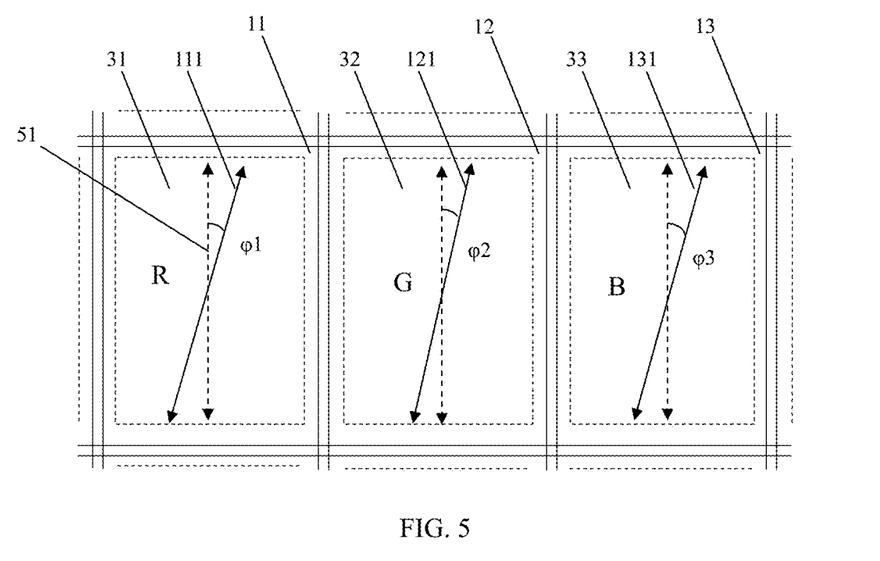
FIG. 5 illustrates a schematic view of more specific polarization relationship between a regionalized polarizer, a color filter, and an upper polarizer according to the present disclosed embodiments.

The regionalized polarizer 10 has the polarization direction configuration illustrated in FIG. 4 and FIG. 5. FIG. 4 illustrates a schematic view of an exemplary regionalized polarizer according to the present disclosure. Referring to FIG. 4, the liquid crystal display panel may include an upper polarizer 50, a regionalized polarizer 10, and a lower polarizer 40. The upper polarizer 50 may have a second absorption axis 51 in the same direction for the entire surface. The lower polarizer 40 may have a first absorption axis 41 in the same direction for the entire surface. The second absorption axis 51 and the first absorption axis 41 may be orthogonal with each other. That is, the upper polarizer 50 and the lower polarizer 40 may have mutually orthogonal polarization directions.

Further, the regionalized polarizer 10 may include a plurality of first polarizing units 11, second polarizing units 12, and third polarizing units 13. The first polarizing unit 11 may have an absorption axis 111, which may form an angle with the second absorption axis 51. The second polarizing unit 12 may have an absorption axis or sub-axis 121, which may form an angle with the second absorption axis or sub-axis 51. The third polarizing unit 13 may have an absorption axis or sub-axis 131, which may also form an angle with the second absorption axis 51.

FIG. 5 illustrates a schematic view of more specific polarization relationship between a regionalized polarizer, a color filter, and an upper polarizer according to the present disclosure. Referring to FIG. 5, the first polarizing unit 11 may correspond to the first color barrier 31, the second polarizing unit 12 may correspond to the second color barriers 32, and the third polarizing unit 13 may correspond to the third color barriers 33. The first polarizing units 11, the second polarizing units 12, and the third polarizing units 13 may have a first absorption sub-axis 111, a second absorption sub-axis 121, and a third absorption sub-axis respectively.

Further, the first absorption sub-axis 111, the second absorption sub-axis 121, and the third absorption sub-axis may form a first angle $\varphi1$, a second angle $\varphi2$, and a third angle $\varphi3$ respectively with the first absorption axis 51. That is, the first polarizing units 11, the second polarizing units 12, and the third polarizing units 13 may have the polarization directions forming the first angle $\varphi1$, the second angle $\varphi2$, and the third angle $\varphi3$ respectively with the polarization direction of the upper polarizer 50.

For illustrating the operation principle of the liquid crystal display panel according to the present disclosure, an assumption is made to have the first angle $\varphi1$, the second angle $\varphi2$, and the third angle $\varphi3$ all equal to 0°. In this case, the first absorption sub-axis 111, the second absorption sub-axis 121, and the third absorption sub-axis 131 are parallel with the first absorption axis 51. That is, the entire surface of the regionalized polarizer 10 has the same polarization direction as the polarization direction of the upper polarizer 50.

In operation, the liquid crystal molecules in the liquid crystal layer 20 are driven by the electric field between the first electrodes 215 and the second electrodes 217. When the voltage applied to the liquid crystal molecules in the liquid crystal layer 20 is smaller than the liquid crystal threshold voltage, the liquid crystal molecules on the surfaces of the upper substrate 22 and the lower substrate 21 may be arranged in the alignment directions of the upper alignment layer 222 on the upper substrate 22 and the lower alignment layer 218 on the lower substrate 21, respectively. That is, the liquid crystal molecules on the substrate surfaces may be arranged in the polarization direction of the lower polarizer 40. So the light emitted from the backlight source (not shown) on the side of the lower substrate 21 facing away from the upper substrate 22 may be blocked substantially by the upper polarizer 50 and the lower polarizer 40 that have mutually orthogonal polarization directions. Thus, the liquid crystal display panel is in a dark state.

When the voltage applied to the liquid crystal molecules in the liquid crystal layer 20 is greater than the liquid crystal threshold voltage, the liquid crystal molecules in the liquid crystal layer 20 may rotate in a plane parallel with the surfaces of the upper substrate 22 and the lower substrate 21. By controlling the voltage, the liquid crystal molecules may be aligned in a direction forming an angle approximately between 0° and 45° with the polarization directions of the upper polarizer 50 and the lower polarizer 40. An incidental light may pass through the lower polarizer 40 to produce a linearly polarized light in the polarization direction of the lower polarizer 40. The linearly polarized light may continue to pass through the liquid crystal molecules and may have the polarization direction rotated by the liquid crystal molecules.

The polarized light may continue to pass through the color filter, the regionalized polarizer 10 and the upper polarizer 50 and may exit the liquid crystal display panel to display images. When the liquid crystal molecules are aligned in a direction forming an approximately 45° angle with the polarization directions of the upper polarizer 50 and the lower polarizer 40, the liquid crystal display panel may have the maximum light transmittance. That is, the liquid crystal display panel may reach the maximum brightness. In order to have the liquid crystal molecules aligned in a direction forming an approximately 45° angle with the polarization directions of the upper polarizer 50 and the lower polarizer 40 to reach the maximum brightness, the upper polarizer 50 and the lower polarizer in the path of the light may be required to have mutually orthogonal polarization directions.

In other words, the angles between the polarization directions of the polarizers in the path of the incident light may be controlled to adjust the light transmittance of the liquid crystal display panel. Maximum brightness of the incident light can be adjusted by adjusting the light transmittance of the incident light. In one embodiment, the first angle φ1, the second angle φ2, and the third angle φ3 may be controlled to adjust the light transmittances in regions of the liquid crystal display panel corresponding to the first color barriers 31, the second color barriers 32, and the third color barriers 33, and hence to adjust the maximum brightness of the colors corresponding to the first color barriers 31, the second color barriers 32, and the third color barriers 33 to obtain the desired white color point.

The present disclosure does not have any limitation on the relationship among the first angle φ1, the second angle φ2, and the third angle φ3. In one embodiment, for example, the product specification may determine that the first angle φ1 is equal to the third angle φ3, and the second angle φ2 is different from the first angle φ1 and the third angle φ3. In another embodiment, the product specification may determine the first angle φ1, the second angle φ2, and the third angle φ3 are different from each other as long as the desired white color point is obtained for the liquid crystal display panel.

In one embodiment, as shown in FIG. 5, the first color barriers 31, the second color barriers 32, and the third color barriers 33 are corresponding to red color barriers (R), green color barriers (G), and blue color barriers (B). The first polarizing units, the second polarizing units, and the third polarizing units are arranged corresponding to the first color barriers 31, the second color barriers 32, and the third color barriers 33, respectively. For example, based on the customer requirement and/or the application environment of the liquid crystal display panel, the white color point of the liquid crystal display panel may need to be yellowish, i.e., the maximum brightness of the red light and the blue light may be increased. In this case, the third angle φ3 may remain the same while the first angle φ1 and the second angle φ2 may be reduced by a same or different amount. Accordingly, the light transmittances in the regions of the liquid crystal display panel corresponding to the red color barriers (R) and the green color barriers (G) may be increased by a same or different amount, and hence the maximum brightness of the red color light and the green color light may be increased to obtain the desired white color point.

In another embodiment, the white color point of the liquid crystal display panel may need to be purplish. In this case, the second angle φ2 may remain the same while the first angle φ1 and the third angle φ3 may be reduced by a same or different amount. Accordingly, the light transmittances in the regions of the liquid crystal display panel corresponding to the red color barriers (R) and the blue color barriers (B) may be increased by a same or different amount, and hence the maximum brightness of the red color light and the blue color light may be increased to obtain the desired white color point.

Although three colors are used to illustrate the various embodiments, other number of colors may also be used, i.e., various number of color barrier types may be used. Further, although the upper polarizer is used to configure the first angle φ1, the second angle φ2, and the third angle φ3, the lower polarizer may also be used to configure the first angle φ1, the second angle φ2, and the third angle φ3. Additionally or optionally, to facilitate the adjustment of the light transmittance of the regions of the color filter coupled by the polarizing regions or units of the regionalized polarizer, the initial values of the first angle φ1, the second angle φ2, and the third angle φ3 may be pre-configured.

For example, an optical alignment process may be used to form the polarizing units of the regionalized polarizer. An organic film forming material may be coated over the substrate. A polarized ultra violet light may be irradiated on the organic material film to form one polarizing unit at a time. Each polarizing unit may have different polarization direction. Then the organic material film may be cured to form the regionalized polarizer. Once cured, the polarization direction in each polarizing unit may be fixed. Once the polarization direction in each polarizing unit is fixed, the light transmittance in the region corresponding to the polarizing unit may be fixed. Accordingly, the maximum brightness of each color corresponding to each color barrier may be fixed. Thus, the white color point may be fixed as well.

In certain embodiments, the white color point may be adjusted without sophisticated thickness control of the color barriers of the color filter. For example, the white color point may be adjusted by controlling the polarization direction of the polarized ultra violet light during the optical alignment process for fabricating the regionalized polarizer.

Thus, in the liquid crystal display panel according to the present disclosure, the upper polarizer 50 and the lower polarizer 40 may have mutually orthogonal polarization directions to ensure that the liquid crystal display panel supports the dark state. In the meantime, the regionalized polarizer 10 may have different polarization directions in different regions forming different angles with the polarization direction of the upper polarizer 50. The light transmittances in the regions corresponding to different colors may be adjusted to obtain the desired white color point by controlling the first angle φ1, the second angle φ2, and the third angle φ3. Since the white color point is not adjusted by controlling the thicknesses of color barriers, the desired white color point may be obtained while the flatness of the color filter is maintained to improve the display effect. In the meantime, different color filters are not needed to obtain different white color points based on different product specifications. Thus, the same color filter may be used commonly for various display products and the production cost may be reduced.

Figure 6:
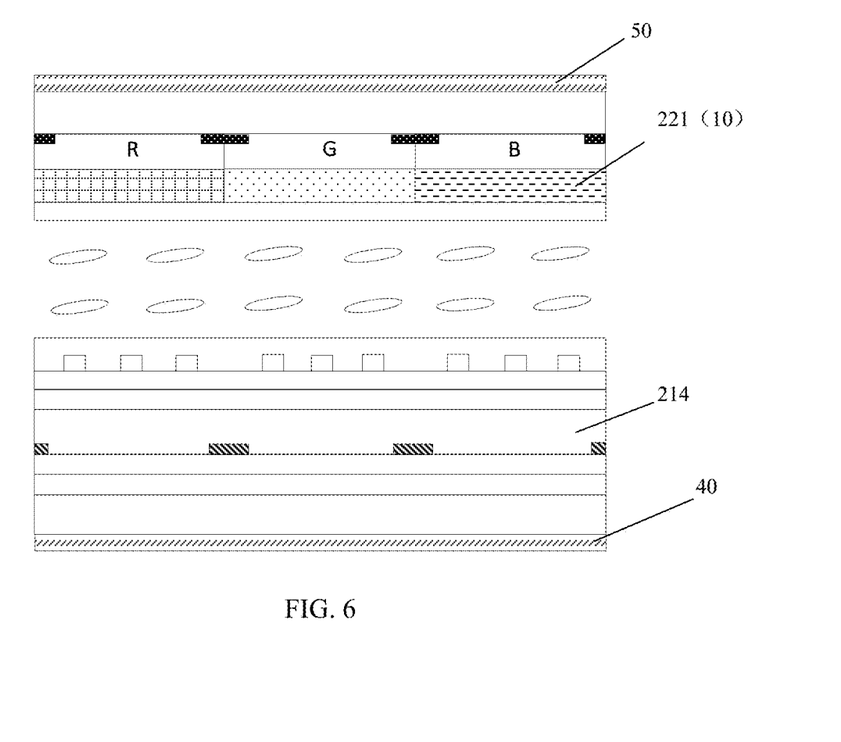
FIG. 6 illustrates a schematic view of another exemplary liquid crystal display panel according to the disclosed embodiments.

The regionalized polarizer 10 is not limited to be coplanar with the lower planarization layer 214 on the lower substrate 21. FIG. 6 illustrates a schematic view of another exemplary liquid crystal display panel according to the present disclosure. Referring to FIG. 6, the liquid crystal display panel is similar to the liquid crystal display panel shown in FIG. 3 with the exception of the position of the regionalized polarizer 10.

In one embodiment, the regionalized polarizer 10 may be coplanar with the upper planarization layer 221 on the upper substrate 22. Because the regionalized polarizer 10 is formed coplanar with either the upper planarization layer 221 or the lower planarization layer 214, no additional layer may be introduced in the fabrication process. Thus, the overall thickness of the liquid crystal display panel may not increase.

The regionalized polarizer 10 is not limited to be coplanar with the lower planarization layer 214 on the lower substrate 21 or the upper planarization layer 221. In other embodiments, the regionalized polarizer 10 may be formed separately on the lower substrate 21 or on the upper substrate 22 rather than coplanar with any existing layer in the liquid crystal display panel.

Further, the present disclosure also provides a method for fabricating the disclosed liquid crystal display panel. The method is illustrated in fabricating the liquid crystal display panel shown in FIG. 3.

Figure 8:
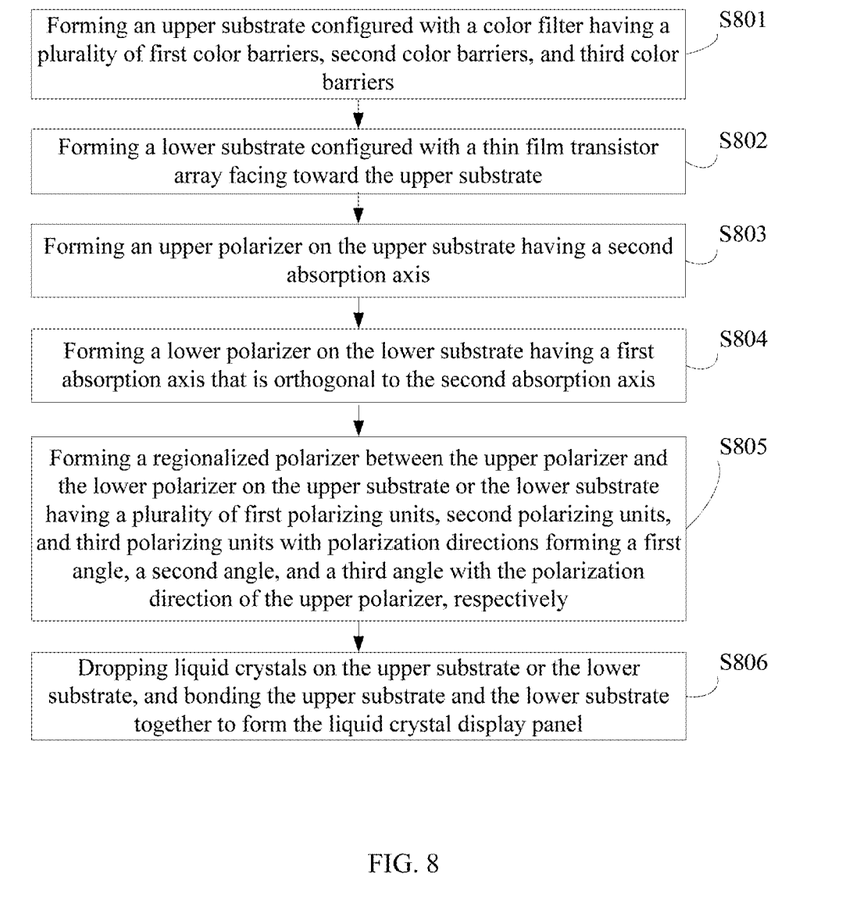
FIG. 8 illustrates an exemplary fabrication process of a liquid crystal display panel according to the disclosed embodiments.

FIG. 8 illustrates an exemplary fabrication process of a liquid crystal display panel according to the present disclosure. Referring to FIG. 8, the fabrication method may include the following steps.

Step S801: forming an upper substrate configured with a color filter having a plurality of first color barriers, second color barriers, and third color barriers.

Specifically, the upper substrate 22 may include a transparent base substrate 220. A color filter 30, an upper planarization layer 221, and an upper alignment layer 222 may be formed sequentially on the transparent base substrate 220.

Step S802: forming a lower substrate configured with a thin film transistor array facing toward the upper substrate.

Specifically, the lower substrate 21 may include a transparent base substrate 210. The transparent base substrate 210 may be sequentially configured with an active layer, a gate insulating layer 212, and a first insulating layer 213. Data lines 25 may be formed on the first insulating layer 213.

Step S803: forming an upper polarizer on the upper substrate having a second absorption axis.

Specifically, an upper polarizer 50 may be formed on the side of the upper substrate 22 facing away from the liquid crystal layer 20.

Step S804: forming a lower polarizer on the lower substrate having a first absorption axis that is orthogonal to the second absorption axis.

Specifically, a lower planarization layer 214 may be formed on the data lines 25 and the first insulating layer 213. A lower polarizer 40 may be formed on the side of the lower substrate 21 facing away from the liquid crystal layer 20. The lower polarizer 40 may have a polarization direction orthogonal to the polarization direction of the upper polarizer 50.

Step S805: forming a regionalized polarizer between the upper polarizer and the lower polarizer on the upper substrate or the lower substrate having a plurality of first polarizing units, second polarizing units, and third polarizing units with polarization directions forming a first angle, a second angle, and a third angle with the polarization direction of the upper polarizer, respectively.

Specifically, the lower planarization layer 214 may also provide a polarizing function. That is, a regionalized polarizer 10 may be formed coplanar with the lower planarization layer 214. Alternatively, the regionalized polarizer 10 may be formed as an independent layer anywhere between the upper polarizer 50 and the lower polarizer 40.

Step S806: dropping liquid crystals on the upper substrate or the lower substrate, and bonding the upper substrate and the lower substrate together to form the liquid crystal display panel.

Finally, the liquid crystals may be dropped onto one of the upper or the lower substrate, and the upper and the lower substrates may be bonded together to form the liquid crystal display panel. Other processes may also be performed to form other components of the liquid crystal display panel.

Figure 7A:
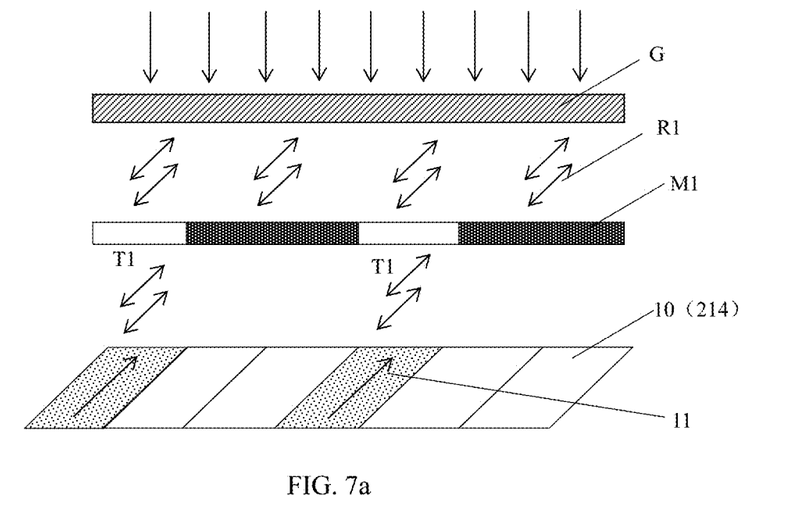
FIG. 7a illustrates a schematic view of an exemplary method of fabricating first polarizing units according to the disclosed embodiments.
Figure 7B:
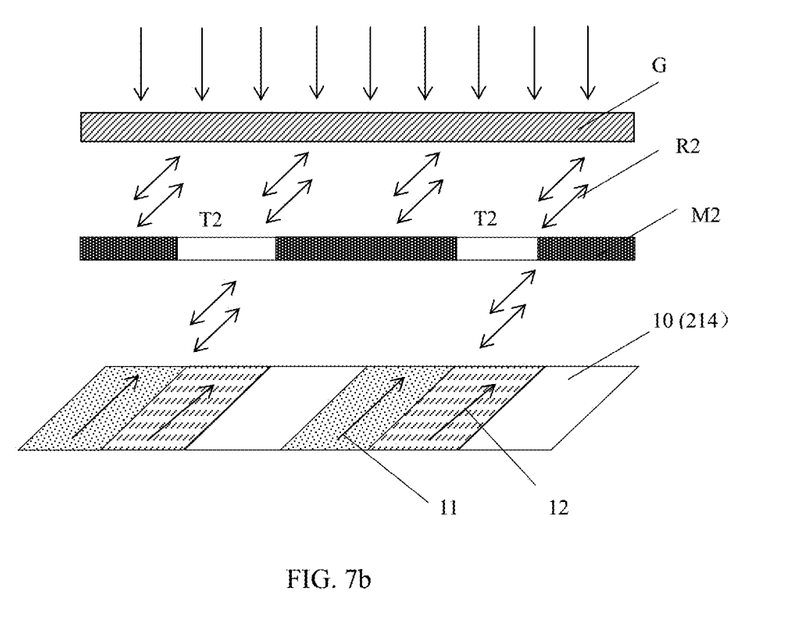
FIG. 7b illustrates a schematic view of an exemplary method of fabricating second polarizing units according to the disclosed embodiments.
Figure 7C:
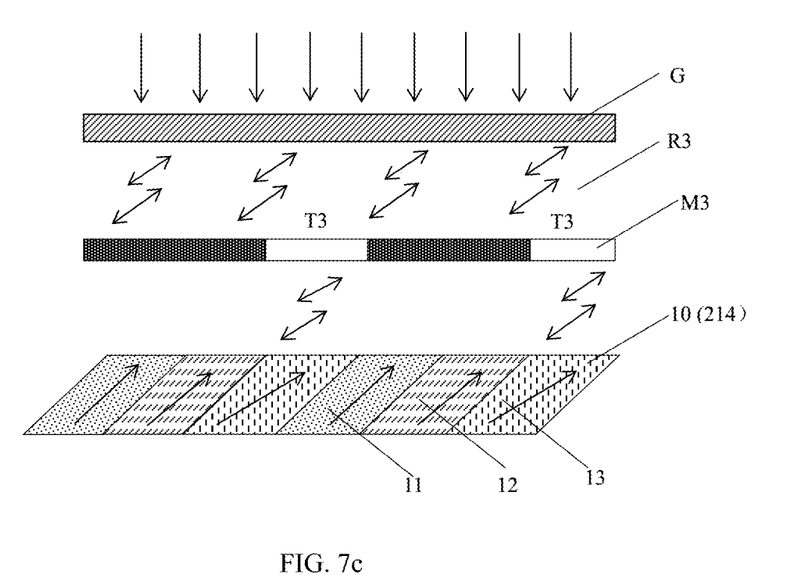
FIG. 7c illustrates a schematic view of an exemplary method of fabricating third polarizing units according to the disclosed embodiments.
Figure 9:
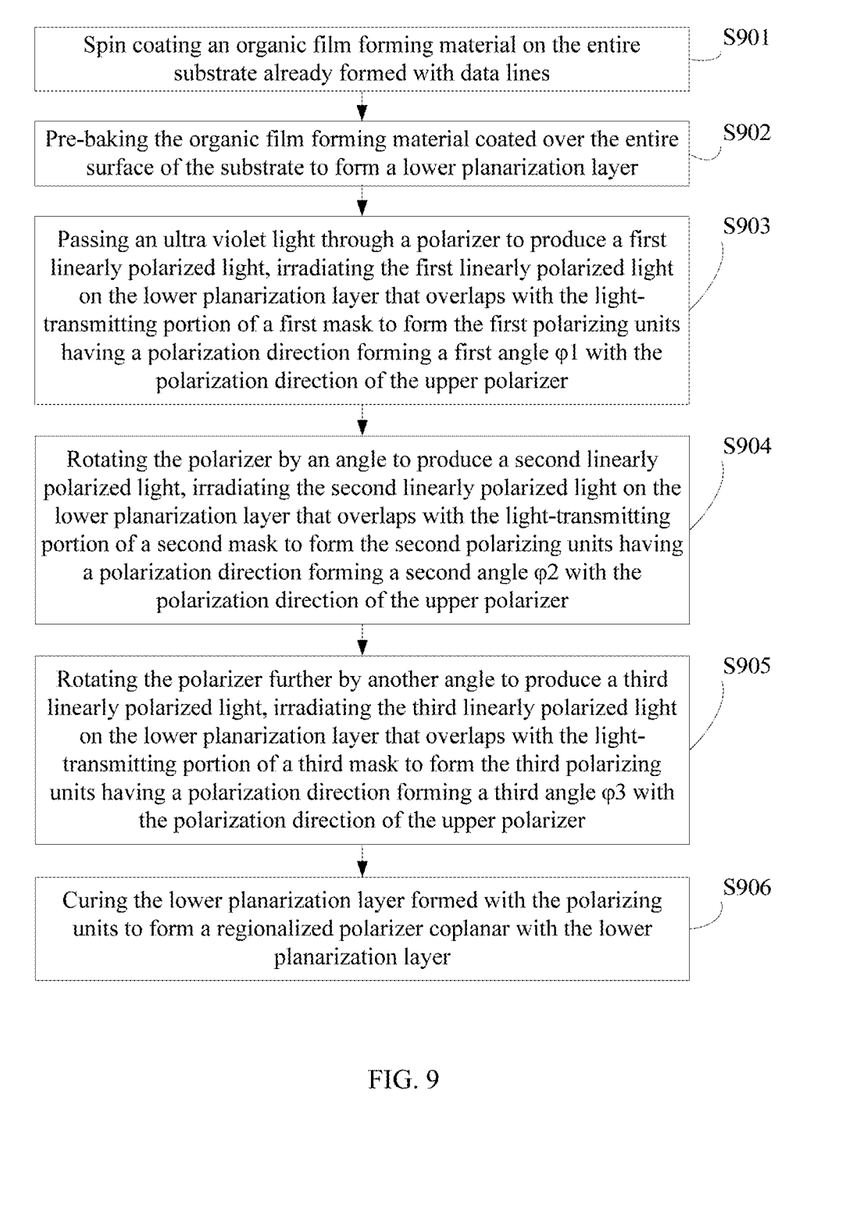
FIG. 9 illustrates an exemplary fabrication process of a regionalized polarizer of the liquid crystal display panel according to the disclosed embodiments.

More specifically, FIG. 9 illustrates an exemplary fabrication process of a regionalized polarizer of the liquid crystal display panel according to the present disclosure. Referring to FIG. 9, the process of fabricating the lower substrate may include forming the coplanar lower planarization layer 214 and the regionalized polarizer 10. The process for fabricating the coplanar lower planarization layer 214 and the regionalized polarizer 10 may include the following steps. FIG. 7a, FIG. 7b, and FIG. 7c illustrate schematic views of various fabrication stages and/or configurations.

Step S901: spin coating an organic film forming material on the entire substrate already formed with data lines.

Specifically, at first, an acrylic resin solution including a mixture of acrylic resin, naphthoquinone diazide ester, 1,4-dioxane, coupling agent, diethylene glycol ethyl methyl ether, and propylene glycol methyl ether acetate may be provided. Then, an optical alignment prepolymer doped with a dichroic organic dye may be mixed in certain proportions with the acrylic resin solution described above to produce an organic film forming material. Next, the organic film forming material may be spin coated over the entire surface of the substrate. Alternatively, the dichroic organic dye may be directly mixed with the acrylic resin solution described above to produce the organic film forming material. In one embodiment, the optical alignment prepolymer may be a photosensitive polyimide, and the dichroic organic dye may be an azo dye.

Step S902: pre-baking the organic film forming material coated over the entire surface of the substrate to form a lower planarization layer.

In the process of spin coating and before the process of pre-baking, due to the fluidity characteristics, the acrylic resin solution described above may fill and smooth the gaps and steps caused by the thickness differences when the gate insulating layer 212 and the first insulating layer 213 are formed through a CVD process. After the process of pre-baking, a flat surface lower planarization layer 214 may be obtained.

Step S903: providing an ultra violet light source emitting an ultra violet light with a wavelength range, for example, approximately between 254 nm and 313 nm, to pass through a polarizer G, for example, a metal grating polarizer to produce a first linearly polarized light R1. Then, the first linearly polarized light R1 may pass through a first mask M1 and may irradiate the lower planarization layer 214.

The first mask M1 may have a light-transmitting portion T1 and the rest of the first mask M1 may be a light-shielding portion. The first linearly polarized light R1 may pass through the light-transmitting portion T1 of the first mask M1 to irradiate the portion of the lower planarization layer 214 that overlaps with the light-transmitting portion T1. The dichroic organic dye in the portion of the lower planarization layer 214 exposed to the first linearly polarized light R1 may be aligned to a certain polarization direction. Thus, the first polarizing units 11 may be formed, as show in FIG. 7a. The first polarizing units 11 may have a polarization direction forming a first angle φ1 with the polarization direction of the upper polarizer 50. Further, referring to FIG. 7a, the plurality of first polarizing units 11 may be formed coplanar with the lower planarization layer 214.

Step S904: adjusting the relative position between the polarizer G and the substrate formed with the first polarizing units 11 on the lower planarization player 214 by horizontally rotating the substrate by an angle, or horizontally rotating the polarizer G by an angle without changing the substrate position, and replacing the first mask M1 with a second mask M2 between the polarizer G and the lower planarization layer 214.

The second mask M2 may have a light-transmitting portion T2 and the rest of the second mask M2 may be a light-shielding portion. A second linearly polarized light R2 may be produced after the ultra violet light passes through the polarizer G. The second linearly polarized light R2 may pass through the light-transmitting portion T2 of the second mask M2 to irradiate the portion of the lower planarization layer 214 that overlaps with the light-transmitting portion T2. The dichroic organic dye in the portion of the lower planarization layer 214 exposed to the second linearly polarized light R2 may be aligned to a different polarization direction. Thus, second polarizing units 12 may be formed, as shown in FIG. 7b. The second polarizing units 12 may have a polarization direction forming a second angle φ2 with the polarization direction of the upper polarizer 50. Further, referring to FIG. 7b, the plurality of second polarizing units 12 may be formed coplanar with the lower planarization layer 214 already formed with the first polarizing units 11.

Step S905: further adjusting the relative position between the polarizer G and the substrate formed with the first polarizing units 11 and the second polarizing units 12 on the lower planarization player 214 by horizontally rotating the substrate by another angle, or horizontally rotating the polarizer G by another angle without changing the substrate position, and replacing the second mask M2 with a third mask M3 between the polarizer G and the lower planarization layer 214.

The third mask M3 may have a light-transmitting portion T3 and the rest of the second mask M3 may be a light-shielding portion. A third linearly polarized light R3 may be produced after the ultra violet light passes through the polarizer G. The third linearly polarized light R3 may pass through the light-transmitting portion T3 of the third mask M3 to irradiate the portion of the lower planarization layer 214 that overlaps with the light-transmitting portion T3. The dichroic organic dye in the portion of the lower planarization layer 214 exposed to the third linearly polarized light R3 may be aligned to another different polarization direction. Thus, third polarizing units 13 may be formed, as shown in FIG. 7c. The third polarizing units 13 may have a polarization direction forming a third angle φ3 with the polarization direction of the upper polarizer 50. Further, referring to FIG. 7c, the plurality of third polarizing units 13 may be formed coplanar with the lower planarization layer 214 already formed with the first polarizing units 11 and the second polarizing units 12.

Step S906: curing the lower planarization layer 214 formed with the polarizing units by performing a second high temperature baking. For example, the second baking may have a high temperature approximately at 230° C. The curing may enhance the anisotropy feature of the first polarizing units 11, the second polarizing units 12, and the third polarizing units 13. Thus, a regionalized polarizer 10 may be formed coplanar with the lower planarization layer 214.

In addition, the present disclosure provides another method for fabricating the liquid crystal display panel. In this case, the regionalized polarizer 10 may be formed as an independent layer rather than being coplanar with any existing layer in the upper or lower substrate. In addition, the fabrication method according to the present disclosure may include a process of fabricating the lower substrate, a process of fabricating the upper substrate, and a process of dropping liquid crystals and bonding the lower substrate and the upper substrate together.

Figure 10:
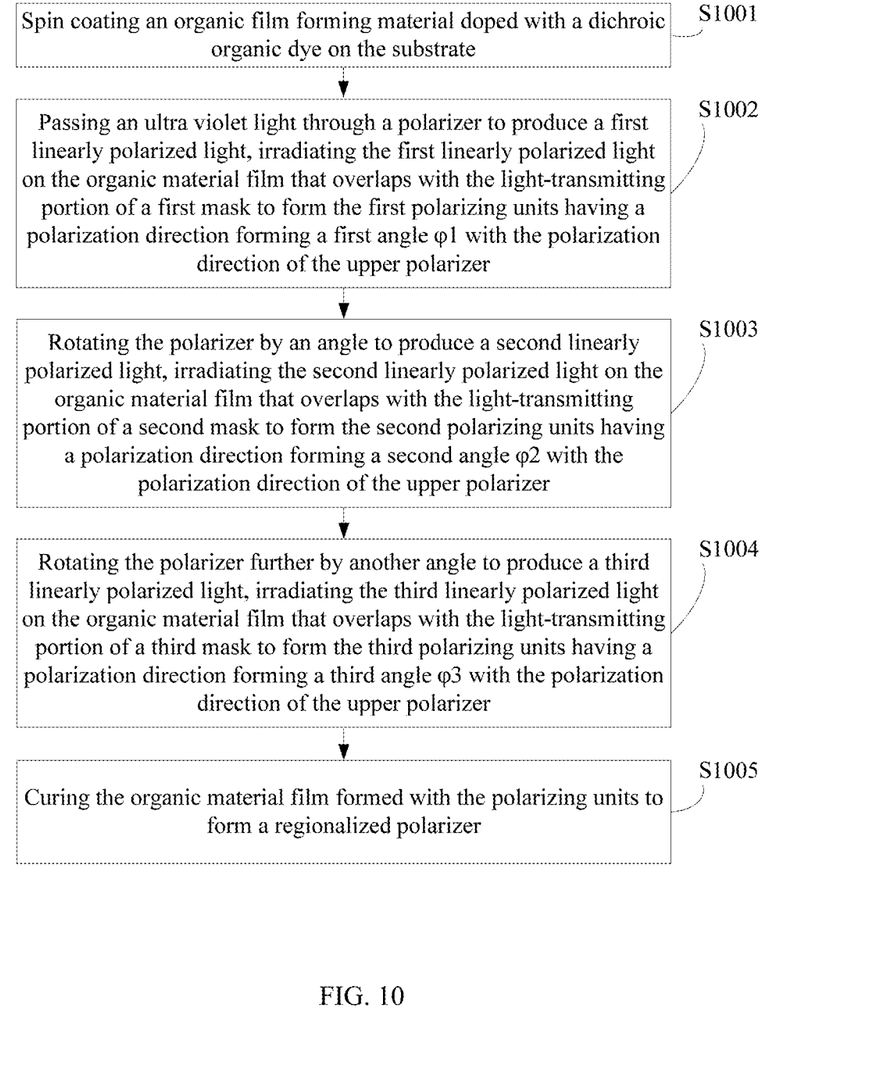
FIG. 10 illustrates another exemplary fabrication process of a regionalized polarizer of the liquid crystal display panel.

FIG. 10 illustrates another exemplary fabrication process of a regionalized polarizer of the liquid crystal display panel according to the present disclosure. Referring to FIG. 10, the process for fabricating the regionalized polarizer 10 on one of the upper or lower substrate may include the following steps.

Step S1001: spin coating an organic film forming material doped with a dichroic organic dye on the entire surface of the substrate.

Specifically, in one embodiment, the organic film forming material may be a photosensitive polyimide, and the dichroic organic dye may be an azo dye.

Step S1002: providing an ultra violet light source emitting an ultra violet light with a wavelength range, for example, approximately between 254 nm and 313 nm, to pass through a polarizer G, for example, a metal grating polarizer to produce a first linearly polarized light R1. Then, the first linearly polarized light R1 may pass through a first mask M1 and may irradiate the organic material film.

The first mask M1 may have a light-transmitting portion T1 and the rest of the first mask M1 may be a light-shielding portion. The first linearly polarized light R1 may pass through the light-transmitting portion T1 of the first mask M1 to irradiate the portion of the organic material film that overlaps with the light-transmitting portion T1. The dichroic organic dye in the portion of the organic material film exposed to the first linearly polarized light R1 may be aligned to a certain polarization direction. Thus, the first polarizing units 11 may be formed. The first polarizing units 11 may have a polarization direction forming a first angle φ1 with the polarization direction of the upper polarizer 50. Referring to FIG. 7a, the plurality of first polarizing units 11 may be formed on the substrate.

Step S1003: adjusting the relative position between the polarizer G and the substrate formed with the first polarizing units 11 by horizontally rotating the substrate by an angle, or horizontally rotating the polarizer G by an angle without changing the substrate position, and replacing the first mask M1 with a second mask M2 between the polarizer G and the organic material film.

The second mask M2 may have a light-transmitting portion T2 and the rest of the second mask M2 may be a light-shielding portion. A second linearly polarized light R2 may be produced after the ultra violet light passes through the polarizer G. The second linearly polarized light R2 may pass through the light-transmitting portion T2 of the second mask M2 to irradiate the portion of the organic material film that overlaps with the light-transmitting portion T2. The dichroic organic dye in the portion of the organic material film exposed to the second linearly polarized light R2 may be aligned to a different polarization direction. Thus, second polarizing units 12 may be formed. The second polarizing units 12 may have a polarization direction forming a second angle φ2 with the polarization direction of the upper polarizer 50. Referring to FIG. 7b, the plurality of second polarizing units 12 may be formed on the substrate already formed with the first polarizing units 11.

Step S1004: further adjusting the relative position between the polarizer G and the substrate formed with the first polarizing units 11 and the second polarizing units 12 by horizontally rotating the substrate by another angle, or horizontally rotating the polarizer G by another angle without changing the substrate position, and replacing the second mask M2 with a third mask M3 between the polarizer G and the organic material film.

The third mask M3 may have a light-transmitting portion T3 and the rest of the second mask M3 may be a light-shielding portion. A third linearly polarized light R3 may be produced after the ultra violet light passes through the polarizer G. The third linearly polarized light R3 may pass through the light-transmitting portion T3 of the third mask M3 to irradiate the portion of the organic material film that overlaps with the light-transmitting portion T3. The dichroic organic dye in the portion of the organic material film exposed to the third linearly polarized light R3 may be aligned to another different polarization direction. Thus, third polarizing units 13 may be formed. The third polarizing units 13 may have a polarization direction forming a third angle φ3 with the polarization direction of the upper polarizer 50.

Referring to FIG. 7c, the plurality of third polarizing units 13 may be formed on the substrate already formed with the first polarizing units 11 and the second polarizing units 12.

Step S1005: curing the organic material film formed with the polarizing units by performing a high temperature baking. For example, the baking may have a high temperature approximately at 230°. The curing may enhance the anisotropy feature of the first polarizing units 11, the second polarizing units 12, and the third polarizing units 13. Thus, a regionalized polarizer 10 may be formed.

In a practical display product design, the first angle φ1, the second angle φ2, and the third angle φ3 may be determined by the product specification. Thus, the liquid crystal display panels may be fabricated with the white color point satisfying the corresponding product specification.

The liquid crystal display panel according to the present disclosure may include an upper polarizer, a lower polarizer, and a regionalized polarizer. The regionalized polarizer may include a plurality of first polarizing units, second polarizing units, and third polarizing units corresponding to a plurality of first color barriers, second color barriers, and third color barriers respectively. The first polarizing units, the second polarizing units, and the third polarizing units may have polarization directions forming a first angle, a second angle, and a third angle with the polarization direction of the upper polarizer respectively. The first angle, the second angle, and the third angle may be controlled to adjust the light transmittances in the regions of the liquid crystal display panel corresponding to the first color barriers, the second color barriers, and the third color barriers, and hence to adjust the maximum brightness of the colors corresponding to the first color barriers, the second color barriers, and the third color barriers. Thus, the desired white color point may be obtained in the liquid crystal display panel to satisfy the display product specification.

Because the white color point is not adjusted by controlling the thicknesses of color barriers, the desired white color point may be obtained while the flatness of the color filter is maintained to improve the display effect. In the meantime, different color filters are not needed to obtain different white color points based on different product specifications. Thus, the same color filter may be used commonly for various display products and the production cost may be reduced.

The specification above provides detailed descriptions of the liquid crystal display panel and the fabrication method according to the present disclosure. Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An liquid crystal display panel, comprising:
    an upper substrate configured with a color filter having a plurality of first color barriers, second color barriers, and third color barriers;
    a lower substrate configured with a thin film transistor array facing toward the upper substrate;
    a liquid crystal layer sandwiched between the upper substrate and the lower substrate;
    an upper polarizer disposed on the upper substrate having a second absorption axis;
    a lower polarizer disposed on the lower substrate having a first absorption axis that is orthogonal to the second absorption axis; and
    a regionalized polarizer having a plurality of first polarizing units, second polarizing units, and third polarizing units with polarization directions forming a first angle, a second angle, and a third angle with the polarization direction of the upper polarizer, respectively.

2. The liquid crystal display panel of claim 1, wherein:
    the first angle, the second angle, and the third angle are configured to adjust light transmittances of regions of the liquid crystal display panel corresponding to the first color barriers, the second color barriers, and the third color barriers, respectively.

3. The liquid crystal display panel of claim 2, wherein:
    the light transmittances in the regions of the liquid crystal display panel corresponding to the first color barriers, the second color barriers, and the third color barriers correspond to maximum brightness of light emitting from the first color barriers, the second color barriers, and the third color barriers, respectively.

4. The liquid crystal display panel of claim 3, wherein:
    the first color barriers, the second color barriers, and the third color barriers are red color barriers, green color barriers, and blue color barriers, respectively.

5. The liquid crystal display panel of claim 4, wherein:
    the first angle φ1 is equal to the third angle φ3, and the second angle φ2 is different from the first angle φ1 and the third angle φ3.

6. The liquid crystal display panel of claim 4, wherein:
    the first angle the second angle φ2, and the third angle φ3 are different from each other.

7. The liquid crystal display panel of claim 4, further including:
    an upper planarization layer wherein the regionalized polarizer is formed coplanar with the upper planarization layer.

8. The liquid crystal display panel of claim 4, further including:
    a lower planarization layer wherein the regionalized polarizer is formed coplanar with the lower planarization layer.

9. The liquid crystal display panel of claim 4, wherein:
    the regionalized polarizer is an independent layer between the upper polarizer and the lower polarizer on the upper substrate or on the lower substrate.

10. A method of fabricating the liquid crystal display panel, comprising:
    forming an upper substrate with a color filter having a plurality of first color barriers, second color barriers, and third color barriers;
    forming a lower substrate with a thin film transistor array facing toward the upper substrate;
    forming an upper polarizer on the upper substrate having a second absorption axis;
    forming a lower polarizer on the lower substrate having a first absorption axis that is orthogonal to the second absorption axis;
    forming a regionalized polarizer between the upper polarizer and the lower polarizer on the upper substrate or the lower substrate having a plurality of first polarizing units, second polarizing units, and third polarizing units with polarization directions forming a first angle, a second angle, and a third angle with the polarization direction of the upper polarizer, respectively; and dropping liquid crystals on the upper substrate or the lower substrate, and bonding the upper substrate and the lower substrate together to form the liquid crystal display panel.

11. The fabrication method of claim 10, wherein forming the regionalized polarizer includes:

spin coating an organic film forming material doped with a dichroic organic dye over the surface of the lower or upper substrate;

forming a plurality of first polarizing units by passing an ultra violet light through a polarizer and a first mask to irradiate the organic material film;

forming a plurality of second polarizing units by passing an ultra violet light through the polarizer rotated by an angle and a second mask to irradiate the organic material film already formed with the first polarizing units;

forming a plurality of third polarizing units by passing an ultra violet light through the polarizer further rotated by another angle and a third mask to irradiate the organic material film already formed with the first polarizing units and the second polarizing units; and curing the organic material film to form the regionalized polarizer.

12. The fabrication method of claim 11, wherein the curing the organic material film further includes:

curing the organic material film by a high temperature baking with a baking temperature approximately at 230° C.

13. The fabrication method of claim 11, wherein:

the organic film forming material is a photosensitive polyimide.

14. The fabrication method of claim 11, wherein:

the dichroic organic dye is an azo dye.

15. The fabrication method of claim 10, wherein forming the regionalized polarizer includes:

spin coating an organic film forming material doped with a dichroic organic dye over the surface of the lower or the upper substrate;

pre-baking the organic film forming material to form a lower planarization layer or an upper planarization layer;

forming a plurality of first polarizing units by passing an ultra violet light through a polarizer and a first mask to irradiate the lower planarization layer or the upper planarization layer;

forming a plurality of second polarizing units by passing an ultra violet light through the polarizer rotated by an angle and a second mask to irradiate the lower planarization layer or the upper planarization layer already formed with the first polarizing units;

forming a plurality of third polarizing units by passing an ultra violet light through the polarizer further rotated by another angle and a third mask to irradiate the lower planarization layer or the upper planarization layer already formed with the first polarizing units and the second polarizing units; and curing the lower planarization layer or the upper planarization layer to form the regionalized polarizer coplanar with the lower planarization layer or the upper planarization layer.

16. The fabrication method of claim 14, wherein curing the lower planarization layer or the upper planarization layer further includes:

curing the lower planarization layer or the upper planarization layer by a high temperature baking with a baking temperature at approximately at 230° C.

17. The fabrication method of claim 14, wherein:

the organic film forming material includes a photosensitive polyimide and a dichroic organic dye mixed with an acrylic resin solution in a certain proportion.

18. The fabrication method of claim 15, wherein:

the acrylic resin solution is a mixture of acrylic resin, naphthoquinone diazide ester, 1,4-dioxane, coupling agent, diethylene glycol ethyl methyl ether, and propylene glycol methyl ether acetate.

* * * * *